Patented Sept. 14, 1937

2,093,073

UNITED STATES PATENT OFFICE 2,093,073

PAINT COMPOSITION

Camille Deguide, Aisemont, near Fosses, Belgium, assignor to Société de Recherches et d'Applications Chimiques (Sorac) Société Anonyme, Brussels, Belgium No Drawing. Application October 30, 1935, Serial No. 47,473. In France December 21, 1934

1 Claim. (Cl. 134—39)

This invention relates to a process for the manufacture of an improved plastic material and to new industrial products obtained from the new plastic material.

It has been ascertained that by heating linseed oil in an autoclave at about 120° C. and in the presence of water, with an amount of barium hydrate corresponding to about two thirds of the amount necessary for a complete saponification of the oil a plastic material is obtained which is capable of receiving numerous useful applications.

The said plastic material, treated with turpentine oil at 100° C. in the proportion of 40 parts in weight of plastic material for 60 parts in weight of turpentine, gives a mass which is still liquid at the ordinary temperature.

From that point of view, this mass is therefore different from the barium soaps obtained by treating linseed oil with an amount of barium hydrate sufficient to completely saponify the oil in the autoclave at 120° C., in the presence of water; indeed the latter barium soaps when heated with turpentine oil, give colloidal jellies which after cooling are already solid for a proportion of 25 parts in weight of barium soap for 75 parts in weight of turpentine.

Example of carrying the invention into effect:

300 kilos of linseed oil are heated in an autoclave at 120° C. with 200 kilos of water and 120 kilos of barium hydrate ($BaO_2H_2.8H_2O$) during one hour; the mass is then allowed to cool and the glycerine-containing water is withdrawn.

The barium soap remains in the autoclave and is collected; it weighs in the wet state about 390 kilos; it is a yellowish plastic material.

If 40 kilos of this product are heated in a closed vessel at about 100° C. with 60 kilos of turpentine, a cloudy liquid is obtained after cooling, which when mixed with pigments (for instance with 100 kilos of minium of lead or with 50 kilos of oxide of zinc, etc.) yields a very stable paint of high covering power, and drying already after about half an hour. This paint may be advantageously mixed with a siccative, for instance with 2% of resinate of cobalt.

This paint does not contain linseed oil, but each particle of pigment is coated with a layer of plastic barium soap, acting protectively against the action of rain, snow, etc.

The new plastic material or barium soap obtained by saponifying linseed oil in an autoclave with an amount of barium hydrate corresponding to two thirds of that necessary for obtaining a complete saponification, does not present the characteristics of a mixture of barium soap obtained from an oil which has been wholly saponified, with another portion of non-saponified oil, but has its own characteristics: for instance, the basic pigments, such as the oxide of zinc become combined and the paint is very stable.

If the liquid obtained from the treatment in a closed vessel at 100° C. of 40 parts in weight of the plastic material with 60 parts in weight of turpentine is subjected to a centrifugal action or to a filtration, the clear filtrate would form after addition of siccative, a very good varnish, very shiny and capable of receiving soluble colouring matter, for instance barium resinates, gums, etc.

These paints and varnishes may serve to protect the metals against rust.

The solution in turpentine oil of the plastic material obtained by saponifying linseed oil to the amount of two thirds by means of hydrate of barium, may be advantageously used for waterproofing textiles, paper or cement concrete.

On the other hand, it has been ascertained that whilst the new plastic material (barium soap obtained by saponifying linseed oil to the two thirds) forms a fluid substance when heated with turpentine oil in a proportion of 40 parts in weight of barium soap for 60 parts in weight of turpentine oil, the mineral spirit on the contrary, on being heated in a proportion of 60 parts in weight of white spirit with 40 parts in weight of barium soap gives a colloidal jelly which is semi-solid at cold.

This colloidal jelly is very useful for holding pigments in suspension, for instance carbon black and plumbago for the manufacture of liquid black polish for stoves.

The colloidal jelly is also very useful for the manufacture of a paint, of which the pigments have different densities; for instance, on mixing 50 parts in weight of the colloidal jelly with 60 parts in weight of standard titanium white (which contains barium sulphate in addition to titanium oxide), a paint is obtained which dries immediately when mixed with siccative, and which does not contain linseed oil.

By drying the plastic material according to the invention, it becomes possible to disperse it in a mixture of turpentine oil and pure alcohol, thus providing another commercial possibility for alcohol.

The plastic material according to the invention may also be used for the manufacture of linoleum and of waxed cloths as a whole or part substitute for the linseed oil, by mixing barium soap with cork powder.

It is also possible to use the plastic material for the manufacture of cellulose films. The plastic material may be dissolved in a suitable solvent, such as amyl acetate, and it can then be mixed with a colloid dispersion of nitrocellulose in the same reagent. After mixing and evaporation of the solution, cellulose films are obtained the cost price of which is lower than that of similar products hitherto obtained, and which in addition remain stable.

*Example*

50 kilos of nitrocellulose are dissolved in 200 kilos of amyl acetate. On the other hand, 50 kilos of the plastic material (barium soap) are dissolved in 200 kilos of amyl acetate. The two filtered liquors are mixed together; the mixture is poured upon tables in the usual manner, and the solvent is recovered by evaporation.

It is possible to proceed in the same manner for cellulose acetate, by replacing amyl acetate by a suitable solvent such as furfurol.

It is also possible to use the plastic material according to the invention (barium soap) in the manufacture of cellulose varnishes, by using the same solvent, mixed or not with diluent substances.

The plastic material according to the invention may also be used as a support for certain insecticides.

It is to be understood that linseed oil may be replaced by other siccative oils, for instance China-wood oil. Also, the turpentine oil may be replaced by other solvents of the plastic material according to the invention.

I claim:

A process for the manufacture of a painting composition remaining liquid at ordinary temperatures, comprising heating a siccative oil, such as linseed oil, to about 120° C. in an autoclave with an amount of barium hydrate corresponding to about two thirds of the amount required for a complete saponification of the oil, and in the presence of water, allowing the mass to cool, removing the glycerin-containing water, dissolving the residue at about 100° C. in a solvent, such as turpentine oil, in the relative proportions of approximately two to three, cooling the product obtained, and adding pigments, as set forth.

CAMILLE DEGUIDE.